United States Patent [19]

Mourray et al.

[11] Patent Number: 4,838,393

[45] Date of Patent: Jun. 13, 1989

[54] HYDRO-MECHANICAL STOP HAVING A RESTRICTIVE PASSAGE

[75] Inventors: Jack W. Mourray, West Bloomfield; James P. Nagy, Romulus, both of Mich.

[73] Assignee: Ford Motor Company, Dearborn, Mich.

[21] Appl. No.: 434,643

[22] PCT Filed: Sep. 20, 1982

[86] PCT No.: PCT/US82/01304

§ 371 Date: Sep. 20, 1982

§ 102(e) Date: Sep. 20, 1982

[51] Int. Cl.$^4$ .............................................. F16F 9/49
[52] U.S. Cl. .................................. 188/284; 188/322.17
[58] Field of Search ............... 188/268, 279, 284, 288, 188/298, 322.11, 322.13, 322.16, 322.17, 322.22, 381; 267/8 R, 9 R, 35, 141, 64.12, 152, 64.15, 63 R, 64.23, 71, 120, 140.1, 141.2, 141.3, 153; 16/58, 86 R, DIG. 9, DIG. 10; 92/85 R, 85 B, 143

[56] References Cited

U.S. PATENT DOCUMENTS

| | | | |
|---|---|---|---|
| 2,642,845 | 6/1953 | Stephens | 188/313 |
| 2,673,625 | 3/1954 | Crabtree | 188/313 |
| 2,981,534 | 4/1961 | Peras | 267/8 R |
| 3,109,520 | 11/1963 | Vossieck | 188/322.22 |
| 3,412,990 | 11/1968 | Gladstone | 267/153 |
| 3,605,553 | 9/1971 | Panigati | 188/284 |
| 3,625,320 | 12/1971 | Doetsch et al. | 188/284 |
| 3,920,253 | 11/1975 | Bauer | 188/317 |
| 4,004,662 | 1/1977 | Sorgartz et al. | 188/284 |
| 4,139,182 | 2/1979 | Nagase et al. | 188/322.17 |
| 4,166,612 | 9/1979 | Freitag et al. | 188/284 |
| 4,230,309 | 10/1980 | Schnitzius | 267/120 |
| 4,240,619 | 12/1980 | Wirges et al. | 267/120 |
| 4,286,802 | 9/1981 | Roche | 188/312 |
| 4,397,452 | 8/1983 | Fouts | 188/284 X |

FOREIGN PATENT DOCUMENTS

| | | | |
|---|---|---|---|
| 1208949 | 1/1966 | Fed. Rep. of Germany | 267/8 R |
| 1266569 | 4/1968 | Fed. Rep. of Germany | 267/152 |
| 2655705 | 6/1978 | Fed. Rep. of Germany | 188/284 |
| 1061688 | 4/1954 | France | 267/63 R |
| 1277125 | 10/1961 | France | 267/35 |
| 2317563 | 2/1977 | France | 267/64.15 |
| 2487030 | 1/1982 | France | 188/284 |

OTHER PUBLICATIONS

*The American Heritage Dictionary,* Second College Edition (Boston: Houghton Mifflin Company, 1982), pp. 1063–1064.

*Primary Examiner*—Duane A. Reger
*Attorney, Agent, or Firm*—Jerome R. Drouillard; Roger L. May

[57] ABSTRACT

A shock absorber (10) has a rebound stop assembly (22). The rebound stop assembly (22) rests upon a shoulder (30) fixed to a piston rod (16). The rebound stop assembly (22) includes an elastomeric ring (24) interposed between two collars (26 and 28) forming an annular chamber (74) therebetween. At the end of the rebound stroke of piston rod (16), the rebound stop assembly (22) is axially compressed between the shoulder (30) of piston rod (16) and the rod guide (18) until the elastomeric ring (24) deforms to abut the inner wall (64) of the working cylinder. As the elastomeric ring deforms, the annular chamber decreases in volume. A restrictive passage (71) allows a restrictive flow of fluid therefrom. An additional chamber (70) is formed which is in restrictive fluid communication through the passage (71) with section (68) of rebound chamber (20). Further compression of the stop assembly (22) decreases the volume of both chambers (70 and 74), and causes restrictive fluid flow out therefrom through the passage (71) into the section (68) of rebound chamber (20). The compression of the elastomeric ring and the restrictive fluid flow provides additional damping at the end of the rebound stroke.

3 Claims, 4 Drawing Sheets

HYDRO-MECHANICAL STOP HAVING A RESTRICTIVE PASSAGE

TECHNICAL FIELD

This invention relates to a stop for a shock absorber and, more particularly, to a hydraulic assisted rebound stop.

BACKGROUND DISCLOSURE INFORMATION

Often shock absorbers are designed such that the damping rate of the shock absorber becomes higher at the extreme ends of the rebound and compression strokes. The additional damping is desired to prevent an abrupt halt to the piston stroke and to prevent jarring metal-to-metal contact between the various parts in the shock absorber. A variety of mechanisms have been devised to render a higher damping rate at the two extremes. Springs and elastomeric jounce bumpers have been incorporated internally as well as externally of the working cylinder. In addition, secondary pistons have been used which become operative only at the extreme ends of the piston stroke. All previous mechanisms added to the cost of the shock absorber.

It is desired to have a hydro-mechanical stop which effectively dampens the end of a piston stroke while being economical to manufacture and assemble.

One hydro-mechanical stop has been disclosed and claimed in a co-pending patent application filed on the same day as the present application by one of the present joint inventors, Mr. Jack Wayne Mourray, and entitled SHOCK ABSORBER WITH A HYDRO-MECHANICAL STOP now U.S. Pat. No. 4,527,674. The present invention is an improvement over the invention claimed in the mentioned co-pending application.

SUMMARY OF THE INVENTION

In accordance with the invention, a shock absorber has a working cylinder with a piston slideably received therein attached to a piston rod which extends through a rod guide at one end of the cylinder. A hydro-mechanical stop is coaxially mounted about the piston rod between the piston and the rod guide. The hydro-mechanical stop includes a tubular resiliently flexible ring mounted about the piston rod. The flexible ring has an outer annular wall having a diameter smaller than the diameter of the inner wall of the working cylinder. The ring rests on a shoulder fixed to the piston rod. The ring is sized relative to the diameter of said piston rod to form an annular chamber therebetween. At the end of a rebound stroke of the piston rod, the ring is axially compressed between the shoulder and the rod guide. Hydraulic fluid is forced from the annular chamber through a restrictive passage section. The ring is sufficiently flexible such that upon axial compression of a predetermined amount, the outer annular wall enlarges until it abuts the inner wall of the working cylinder to form with said cylinder and said rod guide a substantially closed hydraulic chamber. Upon further compression of the flexible ring, hydraulic fluid is forced from the annular chamber and the hydraulic chamber through a restrictive passage section to provide additional damping.

Preferably, collars are mounted at opposite axial ends of the flexible ring. It is desirable that each collar has an axial extending cylinder section with a central aperture therethrough large enough to receive the piston rod and to provide an annular space therebetween. The cylindrical section has an outer wall with a diameter sized such that the cylindrical section is pressed fit within an axial end of the flexible ring. In addition, each collar has a radially extending flange. Each flange has an axially inner facing surface which abuts an axial end of the flexible ring. The outer surface of one of the radially extending flanges has a plurality of circumferentially spaced protrusions which are abuttable with the rod guide. The outer surface of the other radially extending flange has a plurality of protrusions which abut the shoulder fixed to the piston rod. Sections of the restrictive passage are formed by spaces between the protrusions and the annular space about the piston rod. One end of the passage communicates with the hydraulic chamber. The other end communicates with the lower portion of the rebound chamber in the working cylinder. The annular chamber is interposed between the two ends of the passage.

BRIEF DESCRIPTION OF THE DRAWINGS

Reference now will be made to the accompanying drawings in which.

DETAILED DESCRIPTION OF THE PREFERRED EMBODIMENT

Figure 1:
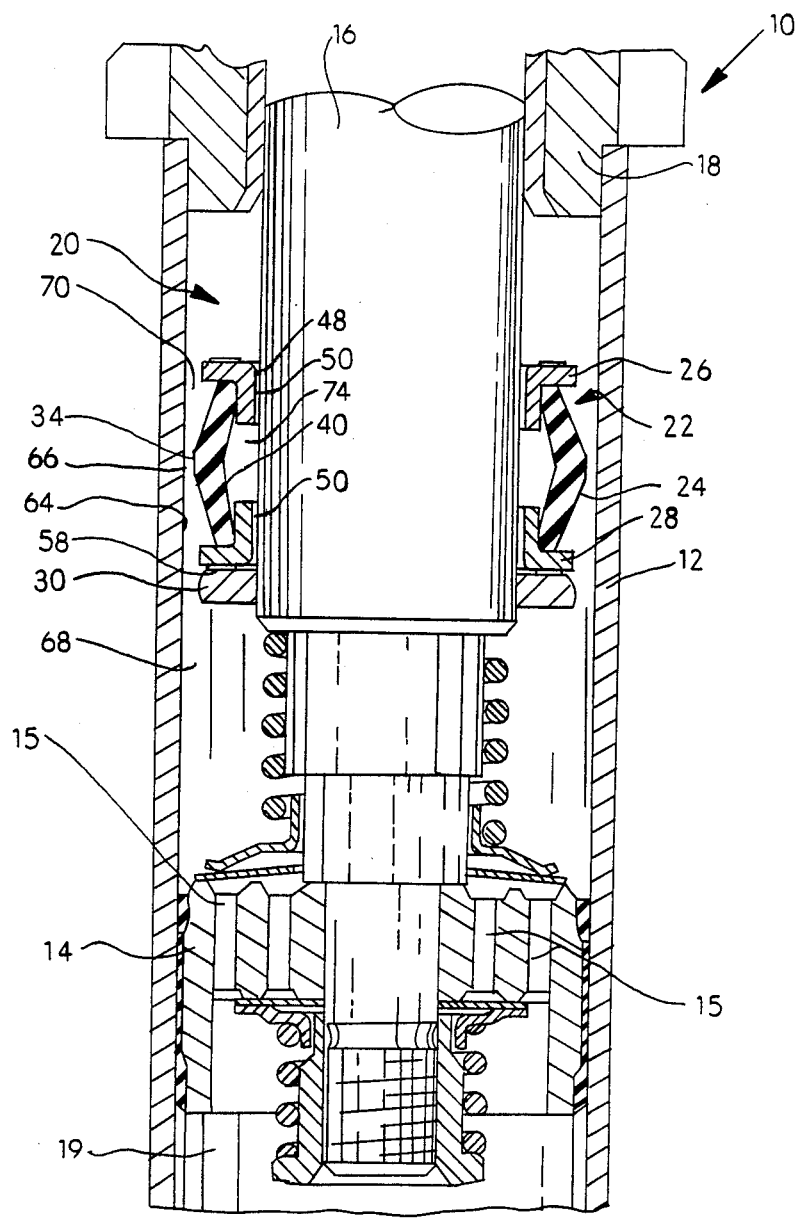
FIG. 1 is a fragmentary side elevational and partially segmented view of a shock absorber disclosing a rebound stop in accordance with the invention.

Referring to FIG. 1, a shock absorber 10 has a working cylinder 12 with a piston 14 slideably mounted therein. The piston 14 is conventional in construction with valved restrictive passageways 15. A piston rod 16 is connected to the piston 14. A rod guide 18 is fixedly mounted at the end of the working cylinder 12. A jounce chamber 19 is defined below the piston 14. A rebound chamber 20 is defined within the cylinder 12 about the piston rod 16 and bounded by the piston 14 and rod guide 18. In addition, a rebound stop assembly 22 is mounted within the working cylinder 12 about the piston rod 16.

Figure 8:
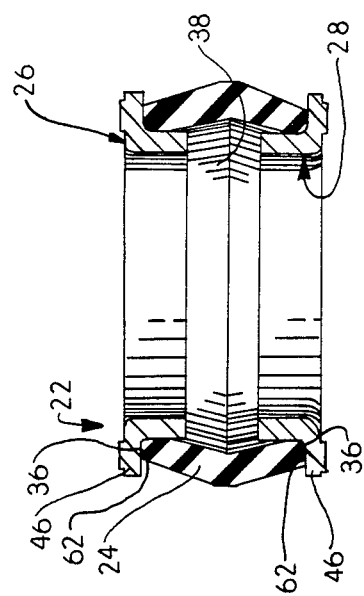
FIG. 8 is a cross-sectional view of the rebound stop assembly shown in FIGS. 1 through 3.

The rebound stop assembly 22, as shown in FIG. 8, includes a tubular elastomeric ring 24 and two collars 26 and 28 which are pressed fit within the elastomeric ring 24. The rebound stop assembly 22 is mounted on top of a shoulder 30 shown in FIG. 1. The shoulder 30 is fixed, at least in the axial direction, to the piston rod 16.

Figure 7:
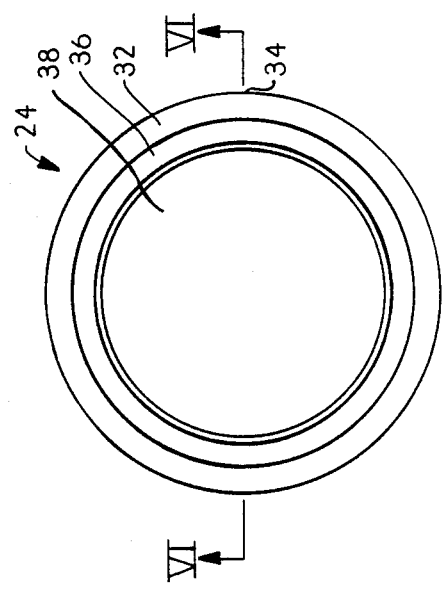
FIG. 7 is a plan view of the elastomeric ring.
Figure 6:
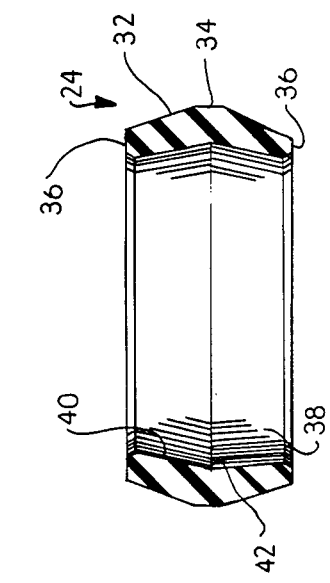
FIG. 6 is a cross-sectional view of the elastomeric ring shown in FIGS. 1 through 3.

The elastomeric ring 24, as shown in more detail in FIGS. 6 and 7, has an annular outer wall 32 of varying diameter with the midsection 34 having the largest diameter and the ends 36 having the smallest diameter. The inner wall 40 defines a central opening 38. The inner wall 40 also has a varying diameter with its largest diameter at midsection 42.

Figure 4:
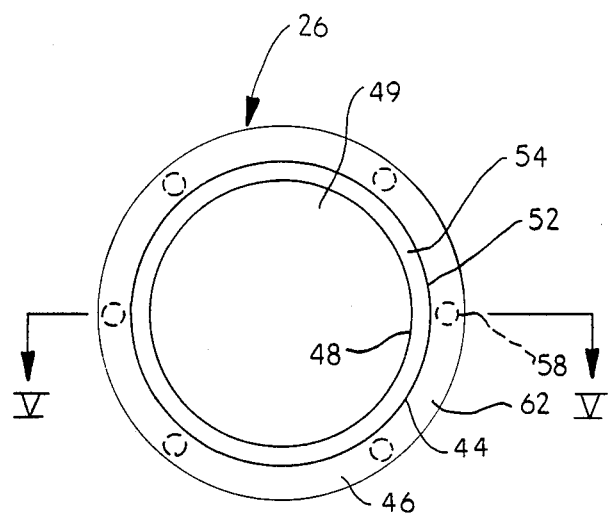
FIG. 4 is a plan view of a collar shown in FIGS. 1 through 3.
Figure 5:
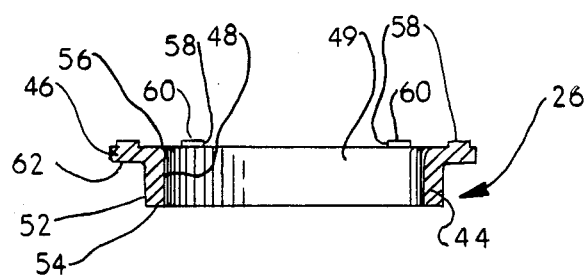
FIG. 5 is a cross-sectional view taken along the lines V—V in FIG. 4.

The collars 26 and 28 are identical in structure; therefore, reference now will only be made to collar 26 shown in FIGS. 4 and 5. The collar 26 has an axially extending portion 44 and a radially extending shoulder 46. The axially extending portion 44 has an inner wall 48 forming a central opening 49 sized to receive a piston rod 16 and to provide an annular gap 50 as shown in FIG. 1. The axial extending portion 44 has an outer wall 52 which is sized to be pressed fit within the opening 38 at end 36 of the elastomeric ring 24. The inner wall 48 and outer wall 52 define the inner and outer diameter of an annular axial end 54. The radially extending shoulder 46 defines the second end 56 of collar 26. The end 56 has a plurality of circular protrusions 58 circumferentially spaced about the collar. Each protrusion 58 has a flat end surface 60. Each shoulder 46 also has an axial inner facing surface 62 which extends radially outwardly from annular wall 52.

As shown in FIG. 8, collars 26 and 28 have their axial portions pressed fitted within the opening 38 at the opposite ends 36 of ring 24. The inner facing surface 62 of shoulder 46 of each collar abuts a respective end 36 of the ring 24.

Referring back to FIG. 1, the assembly 22 is mounted about the piston rod 16 seated on shoulder 30 within the rebound chamber 20. More specifically, the protrusions 58 of collar 28 rest on shoulder 30. The assembly 22 slides through the rebound chamber 20 as the piston 14 correspondingly slides within the cylinder 12. The midsection 34 has a diameter substantially smaller than the inner wall 64 of cylinder 12, thereby forming a substantially large annular gap 66 between lower section 68 and upper section 70 of the rebound chamber 20. The restriction between the sections 68 and 70 through gap 66 is significantly lower than the restriction through valved passages 15 in piston 14. The gap 66 consequently does not add any significant damping to the relative motion of the piston rod 16 and the cylinder 12 during normal vibrations. In other words, the assembly 22 does not interfere with the normal damping characteristics of the shock absorber 10 during the normal stroke range.

Figure 2:
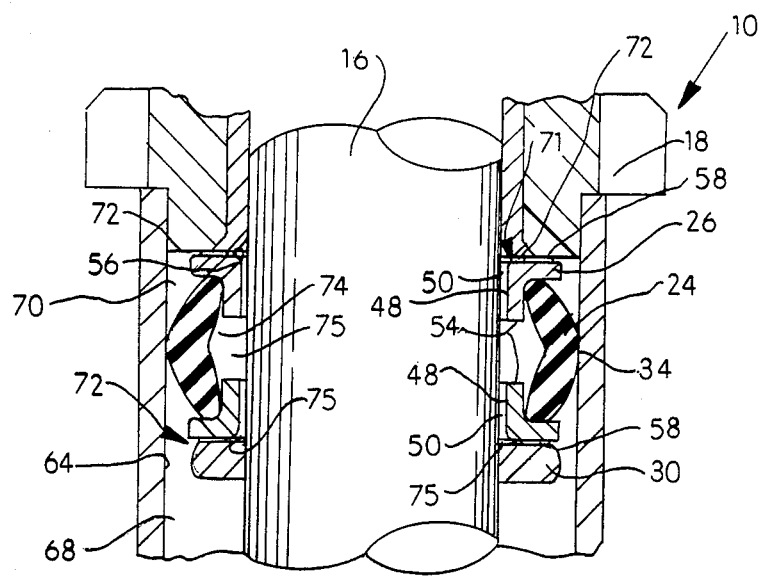
FIG. 2 is a view similar to FIG. 1 showing the rebound stop in partial compression.

However, when the piston rod 16 approaches the end of its rebound stroke, the assembly 22 provides additional damping. The assembly 22 is moved upward through cylinder 12 until the protrusions 58 on collar 26 abut the rod guide 18. Further upward motion of the piston rod 16 causes shoulder 30 and rod guide 18 to axially compress the flexible ring 24. The deformation of the elastomeric ring 24 provides a certain amount of additional damping. The axial compression of ring 24 causes the outer diameter section 34 to enlarge and abut the inner wall 64 of the cylinder as shown in FIG. 2. Free fluid communication between section 68 of the rebound chamber 20 and section 70 is interrupted by the closure of gap 66. Sections 68 and 70 become two separate chambers.

A restrictive passage 71 between chambers 68 and 70 is simultaneously formed. The upper portion 72 of the passage 71 is interposed between the upper surface 56 of collar 26 and the rod guide 18 between the circumferentially spaced protrusions 58. The annular gap 50 formed between the piston rod 16 and the inner wall 48 of collar 26 defines a second section of the passage 71. An annular chamber 74 formed between the collars 26 and 28 and between the piston rod 16 and the inner wall 40 of the flexible collar 24 defines a third section of the passage 71. The gap 50 between the inner wall 48 of collar 28 and the piston rod 16 defines a fourth section of the passage 72. A fifth section 75 of the passage is formed between the shoulder 30 and the outer surface 56 of the collar 28 between the spaced protrusions 58.

Further upward movement of the piston rod 16 is damped by a highly restrictive fluid flow out from chambers 70 and 74 and the additional compression of elastomeric ring 24. The chamber 70 decreases in volume as the piston rod moves upwardly to compress the elastomeric ring 24. The fluid therein is forced through the restrictive passage 71 to chamber 68. In addition, the axial dimension of annular chamber 74 is shortened resulting in a decreased volume. The fluid within chamber 74 is also forced through the fourth and fifth sections of passage 71 to the chamber 68.

The passage 71 allows a sufficient fluid flow from chamber 74 to prevent the hydraulic fluid therein from being excessively pressurized. Excessive pressure within chamber 74 may separate the flexible elastomeric ring 24 from its collars 26 and 28. In other words, the passage 72 provides a metered flow from both chambers 70 and 74.

As the axial ends 54 of the collars come toward each other, a gap 75 therebetween narrows down. When the gap 75 becomes sufficiently narrow, it provides a restriction to the remainder of passage 71 from chamber 74. This restriction decreases the flow from chamber 74 further increasing the damping of the shock absorber. The decreased flow from chamber 74 occurs only after the elastomeric ring 24 is deformed to be sufficiently thick to withstand the buildup of pressure within chamber 74.

Figure 3:
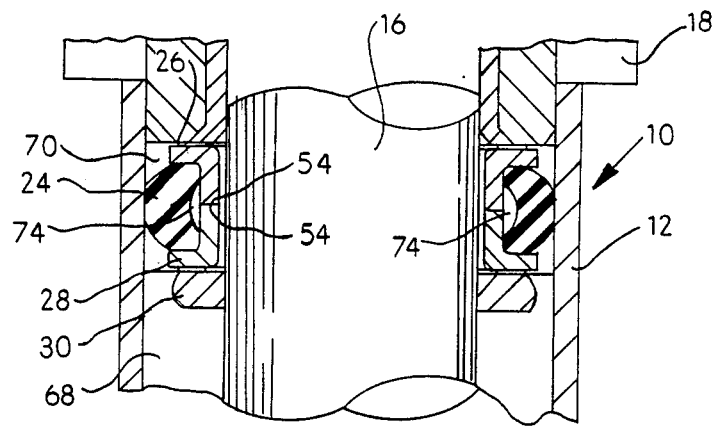
FIG. 3 is a view similar to FIG. 2 showing the rebound stop in full compression.

If the rebound stroke is sufficiently strong to continue against the additional damping, the ends 54 of the collars 26 and 28 abut each other, as shown in FIG. 3, and further axial compression of the elastomeric ring 24 is prevented. At this point, the piston rod 16 can no longer move upwardly. However, between the position as shown in FIG. 1 and the position shown in FIG. 3, the rebound stop assembly 22 provides high damping of the rebound stroke to soften any jarring impact which may otherwise occur when the piston rod is in the position shown in FIG. 3. Alternatively, the rebound stop assembly 22 may altogether prevent any jarring impact by totally damping the stroke before the piston rod attains the position shown in FIG. 3.

Passage 71 may be alernatively arranged. Alternatives can include axially extending notches cut into the midsection 34 of the elastomeric ring 24 such that when midsection 34 abuts the inner wall 64 of the cylinder 12, the notches will form a restrictive passage and restrict flow from chamber 70 to section 68.

In this fashion, an easily manufactured rebound stop is possible which provides high damping capabilities as well as being economical to manufacture and easy to install on existing shock absorbers with minimal amount of modification.

Variations and modifications of the present invention are possible without departing from its scope and spirit as defined by the appended claims.

INDUSTRIAL APPLICABILITY

This invention has industrial applicability to shock absorbers and provides a damping system for the shock absorber at the end of a stroke.

The embodiments of the invention in which an exclusive property or privilege is claimed are defined as follows:

1. In a telescopic shock absorber including a working cylinder, a piston slideably received within said working cylinder and defining a boundary for a rebound chamber within said cylinder, a piston rod connected to said piston and extending through one end of said working cylinder means for closing said one end of said cylinder and slideably mounting said piston rod, the improvement comprising a hydro-mechanical stop characterized by:

a resiliently flexible ring mounted about said piston rod;

said ring having an annular outer wall with a diameter smaller than the diameter of an inner wall of said working cylinder;

first and second collars pressed fit into opposite axial open ends of said flexible ring;

each collar having an axial extending portion;

said axial extending portion having an inner wall with a diameter sized to receive said piston rod with a clearance therebetween and an outer diameter sized to be pressed fit within said flexible ring;

each collar having a radially outwardly extending shoulder, said shoulder having a surface facing axially inwardly for abutting an axial end of said flexible ring and a surface facing axially outwardly;

said surface facing axially outwardly having a plurality of axially extending protrusions circumferentially spaced thereabout;

said flexible ring and pressed fit collars interposed between said closure means and a shoulder fixed to said piston rod such that, at the end of a rebound stroke of said piston rod, said shoulder and said closure means axially compress said ring by pressing against said protrusions of said respective second and first collars;

said flexible ring being sufficiently flexible such that, when it is axially compressed a predetermined amount, the diameter of an annular portion of said annular wall enlarges to abut said inner wall of said working cylinder and forming with said cylinder and said closure means a hydraulic chamber;

the inner wall of said flexible ring spaced from said piston rod defining an annular chamber therebetween;

said second collar, when in abutment with said shoulder fixed to said piston rod forming a second restrictive passage section between said annular chamber and said rebound chamber, said second restrictive passage section running radially between said shoulder fixed to said piston rod and said shoulder of said second collar and thence along the axial, annular space formed by the inner wall of said second collar and said piston rod;

said first collar and said closure means, when in abutment with each other, forming a first restrictive passage section from said hydraulic chamber to said annular chamber, said first restrictive passage section running radially between said closure means and said shoulder of said first collar and thence along the axial, annular space formed by the inner wall of said first collar and said piston rod; and said first restrictive passage section restricting hydraulic fluid flow in a controlled manner from said hydraulic chamber into said annular chamber and said second restrictive passage section restricting hydraulic fluid flow in a controlled manner from said annular chamber into that portion of said rebound chamber lying between said shoulder fixed to said piston rod and said piston upon further compression of said flexible ring beyond said predetermined amount.

2. In a telescopic shock absorber including a working cylinder, a piston slideably received within said working cylinder and defining a boundary for a rebound and jounce chamber within said cylinder, a piston rod connected to said piston and extending through one end of said working cylinder, the improvement comprising a hydro-mechanical stop characterized by:

a resiliently flexible ring mounted about said piston rod;

said ring having an outer annular wall with a diameter smaller than the diameter of an inner wall of said working cylinder;

said ring having an internal diameter larger than the diameter of said piston rod such that an annular chamber is formed therebetween;

said ring interposed between said end of said working cylinder and a shoulder fixed to said piston rod such that, at the end of a rebound stroke of said piston rod, said shoulder and said end of said working cylinder axially compress said ring;

a metering passage interposed between said ring and said end of said working cylinder, said ring and said piston rod, and said ring and said shoulder affixed to said piston rod;

said ring being sufficiently flexible such that, when it is axially compressed a predetermined amount, the diameter of an annular portion of said annular wall enlarges to abut said inner wall of said working cylinder and to form with said inner wall of said working cylinder and said end of said working cylinder a hydraulic chamber;

said annular chamber constructed to decrease in volume as said ring compresses; and said metering passage communicating said hydraulic chamber and said annular chamber with the remainder of said rebound chamber such that upon axial compression of said flexible ring to said predetermined amount, a restrictive fluid flow occurs from said annular chamber to said remainder of said rebound chamber, and upon further axial compression of said ring beyond said predetermined amount, a restrictive fluid flow occurs from said hydraulic chamber and said annular chamber to said remainder of said rebound chamber.

3. A hydro-mechanical stop for a telescopic shock absorber comprising:

a tubular resiliently flexible ring;

a first and second collar mounted at opposite axial ends of said ring;

each collar having an axial extending portion;

each axial extending portion having an inner diameter sized to fit about a piston rod with a clearance therebetween;

each axial extending portion having an outer wall sized to be pressed fit within an opening at each axial end of said flexible ring;

each collar having a radially extending shoulder with an axially inner facing surface for abutting a respective axial end of said flexible ring;

each collar having an axially outer facing end surface;

each other facing end surface having axially extending protrusions circumferentially spaced thereabout.

* * * * *